(12) United States Patent
Simon et al.

(10) Patent No.: US 11,125,453 B2
(45) Date of Patent: Sep. 21, 2021

(54) CALIBRATION OF AN ACTUATOR

(71) Applicant: Carrier Corporation, Farmington, CT (US)

(72) Inventors: Emile Simon, Cork (IE); Kushal Mukherjee, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 169 days.

(21) Appl. No.: 16/083,277

(22) PCT Filed: Mar. 7, 2017

(86) PCT No.: PCT/US2017/021058
§ 371 (c)(1),
(2) Date: Sep. 7, 2018

(87) PCT Pub. No.: WO2017/155924
PCT Pub. Date: Sep. 14, 2017

(65) Prior Publication Data
US 2019/0024921 A1 Jan. 24, 2019

Related U.S. Application Data

(60) Provisional application No. 62/306,265, filed on Mar. 10, 2016.

(51) Int. Cl.
*F24F 11/30* (2018.01)
*F24F 11/00* (2018.01)
(Continued)

(52) U.S. Cl.
CPC ............... *F24F 11/30* (2018.01); *F03G 7/06* (2013.01); *F24F 11/0001* (2013.01); *G05B 15/02* (2013.01)

(58) Field of Classification Search
CPC ............ F15B 19/002; F15B 2211/6654; F15B 19/00; F16D 2500/70294; F16H 2342/10;
(Continued)

(56) References Cited

U.S. PATENT DOCUMENTS 3,555,252 A * 1/1971 Garden ............ G05B 13/0265
700/47
4,406,397 A 9/1983 Kamata
(Continued)

FOREIGN PATENT DOCUMENTS

| CA | 2846802 A1 | 12/2014 |
|---|---|---|
| EP | 2338412 A1 | 6/2011 |

(Continued)

OTHER PUBLICATIONS

Sagnella (Model fitting, parameter estimation, linear and non-linear regression, 1985) (Year: 1985).*
(Continued)

*Primary Examiner* — Darrin D Dunn
(74) *Attorney, Agent, or Firm* — Cantor Colburn LLP

(57) ABSTRACT

A method for controlling an actuator of a terminal unit in a climate control system includes, in a calibration mode: applying a range of drive signals to the actuator; determining a range of terminal unit capacities over the range of drive signals; and generating a model relating the range of terminal unit capacities to the range of drive signals.

11 Claims, 4 Drawing Sheets

(51) Int. Cl.
*G05B 15/02* (2006.01)
*F03G 7/06* (2006.01)

(58) Field of Classification Search
CPC . F16H 61/061; G05B 13/024; G05B 13/0265; G05B 2219/36518; G05B 2219/42152; G05B 19/425; G05B 2219/41176; G05B 2219/41214
See application file for complete search history.

(56) References Cited

U.S. PATENT DOCUMENTS

| | | | | |
|---|---|---|---|---|
| 4,456,863 | A * | 6/1984 | Matusek | G05B 19/251 318/572 |
| 4,780,829 | A * | 10/1988 | Kiya | G05B 19/4062 700/193 |
| 5,139,197 | A | 8/1992 | Seshimo et al. | |
| 5,301,128 | A * | 4/1994 | Bybee | F15B 19/00 700/10 |
| 5,371,457 | A * | 12/1994 | Lipp | G01R 31/3004 324/73.1 |
| 5,373,457 | A * | 12/1994 | George | G09B 23/00 327/334 |
| 5,491,649 | A | 2/1996 | Friday, Jr. et al. | |
| 5,705,734 | A * | 1/1998 | Ahmed | F24F 11/0001 73/1.35 |
| 6,549,826 | B1 | 4/2003 | Pouchak et al. | |
| 6,565,064 | B2 * | 5/2003 | Smith | G05B 19/44 251/129.04 |
| 6,919,809 | B2 | 7/2005 | Blunn et al. | |
| 6,964,174 | B2 | 11/2005 | Shah | |
| 6,981,383 | B2 | 1/2006 | Shah et al. | |
| 7,017,827 | B2 | 3/2006 | Shah et al. | |
| 7,024,258 | B2 | 4/2006 | Ahmed et al. | |
| 7,036,559 | B2 | 5/2006 | Stanimirovic | |
| 7,036,743 | B2 | 5/2006 | Shah | |
| 7,117,045 | B2 * | 10/2006 | Hittle | G05B 13/027 700/48 |
| 7,177,776 | B2 | 2/2007 | Whitehead | |
| 7,653,459 | B2 | 1/2010 | Pouchak et al. | |
| 7,682,234 | B1 | 3/2010 | Beitelmal et al. | |
| 7,987,023 | B2 | 7/2011 | Bush et al. | |
| 8,027,742 | B2 | 9/2011 | Seem et al. | |
| 8,038,075 | B1 | 10/2011 | Walsh | |
| 8,086,329 | B2 * | 12/2011 | Keefover | G05B 13/024 700/47 |
| 8,096,140 | B2 | 1/2012 | Seem | |
| 8,200,344 | B2 | 6/2012 | Li et al. | |
| 8,235,777 | B2 | 8/2012 | Stanimirovic | |
| 8,405,337 | B2 * | 3/2013 | Gebhart | H02P 6/085 318/400.01 |
| 8,412,357 | B2 * | 4/2013 | Seem | F25B 49/027 700/28 |
| 8,423,192 | B2 | 4/2013 | Liu | |
| 8,505,872 | B2 * | 8/2013 | Kawamura | F16K 31/04 123/568.19 |
| 8,793,022 | B2 | 7/2014 | Uden | |
| 8,862,182 | B2 * | 10/2014 | Shukla | H02K 41/0356 340/439 |
| 9,715,237 | B2 * | 7/2017 | Schick | G05D 7/0635 |
| 10,108,154 | B2 * | 10/2018 | Varadi | G05B 13/04 |
| 10,317,261 | B2 * | 6/2019 | Noboa | F25B 13/00 |
| 2005/0067989 | A1 * | 3/2005 | Lagarde | G05B 19/425 318/466 |
| 2006/0016427 | A1 | 1/2006 | Uda | F02D 9/1095 123/399 |
| 2007/0215206 | A1 * | 9/2007 | Lull | G01F 25/0007 137/10 |
| 2007/0223136 | A1 * | 9/2007 | Hutsell | G11B 5/556 360/78.05 |
| 2008/0004754 | A1 * | 1/2008 | Pouchak | F24F 3/0442 700/276 |
| 2008/0082242 | A1 * | 4/2008 | Dell'Eva | F16H 61/0251 701/60 |
| 2008/0163937 | A1 * | 7/2008 | Esposito | F16K 37/0091 137/487.5 |
| 2009/0222179 | A1 * | 9/2009 | Zheng | G05D 16/2013 701/58 |
| 2009/0222180 | A1 * | 9/2009 | Kraenzlein | F16K 37/0091 701/59 |
| 2009/0267557 | A1 * | 10/2009 | Keefover | G05B 13/024 318/565 |
| 2009/0277243 | A1 * | 11/2009 | Zhang | G01F 15/005 73/1.16 |
| 2009/0277519 | A1 * | 11/2009 | Parker | F15B 19/002 137/625.65 |
| 2009/0314484 | A1 * | 12/2009 | Barrett | G05D 23/192 165/293 |
| 2011/0260083 | A1 * | 10/2011 | Labataille | F16K 1/221 251/129.01 |
| 2011/0264280 | A1 | 10/2011 | Grabinger et al. | |
| 2012/0104295 | A1 * | 5/2012 | Do | G05B 9/03 251/129.01 |
| 2012/0136490 | A1 * | 5/2012 | Weatherbee | G01B 7/003 700/282 |
| 2013/0103324 | A1 * | 4/2013 | Waseen | B60H 1/00857 702/33 |
| 2013/0186119 | A1 * | 7/2013 | Burns | F25B 1/00 62/115 |
| 2014/0083159 | A1 * | 3/2014 | Nagai | G01F 25/0053 73/1.34 |
| 2014/0085065 | A1 | 3/2014 | Biggs et al. | |
| 2014/0129035 | A1 * | 5/2014 | Marquette | B62D 5/075 700/282 |
| 2014/0261714 | A1 * | 9/2014 | Burt | F24D 19/1015 137/10 |
| 2014/0283918 | A1 * | 9/2014 | Dederich | F16K 37/0083 137/8 |
| 2014/0305525 | A1 * | 10/2014 | Le Moing | F16K 37/0083 137/553 |
| 2014/0337256 | A1 * | 11/2014 | Varadi | G05B 13/04 706/12 |
| 2014/0371998 | A1 * | 12/2014 | Moorman | B60W 10/10 701/53 |
| 2015/0057816 | A1 * | 2/2015 | Schick | G05D 23/1919 700/282 |
| 2015/0088321 | A1 * | 3/2015 | Schmidt | G05B 13/02 700/282 |
| 2015/0128720 | A1 * | 5/2015 | Royster | G05D 7/0635 73/861 |
| 2015/0169797 | A1 * | 6/2015 | Marwah | G05D 23/1917 703/6 |
| 2015/0233469 | A1 * | 8/2015 | Moorman | F16H 61/0251 701/68 |
| 2016/0054741 | A1 * | 2/2016 | Thuillard | F24F 11/62 700/276 |
| 2016/0124436 | A1 * | 5/2016 | Carter | F16K 31/122 137/315.01 |
| 2016/0266166 | A1 * | 9/2016 | Shi | B82Y 35/00 |
| 2016/0305312 | A1 * | 10/2016 | Ismail | F02B 37/183 |
| 2017/0003150 | A1 * | 1/2017 | Noboa | G01F 1/34 |
| 2017/0138781 | A1 * | 5/2017 | Adibhatla | F02C 7/232 |
| 2017/0314800 | A1 * | 11/2017 | Bengea | F24F 11/30 |
| 2019/0137303 | A1 * | 5/2019 | Dierolf | G01D 5/24452 |
| 2019/0162436 | A1 * | 5/2019 | Albinger | F24F 11/74 |
| 2019/0309561 | A1 * | 10/2019 | Hall | E05F 15/72 |
| 2020/0041153 | A1 * | 2/2020 | Freund | F24F 11/58 |

FOREIGN PATENT DOCUMENTS

| | | |
|---|---|---|
| EP | 2372483 A1 | 10/2011 |
| EP | 2568228 A2 | 3/2013 |
| EP | 2660527 A1 | 11/2013 |
| EP | 2955608 A1 | 12/2015 |
| JP | H03102133 A | 4/1991 |
| JP | H0763404 A | 3/1995 |
| JP | 2013245912 A | 12/2013 |
| JP | 5855880 B2 | 2/2016 |

(56) References Cited

FOREIGN PATENT DOCUMENTS

WO        02066903 A1    8/2002
WO    2009071898 A1    6/2009

OTHER PUBLICATIONS

International Search Report and Written Opinion for application PCT/US2017/021058, dated Jun. 16, 2017, 13 pages.

* cited by examiner

CALIBRATION OF AN ACTUATOR

BACKGROUND

Embodiments relate generally to climate control systems, and more particularly to calibrating one or more actuators in a terminal unit in a climate control system.

Existing climate control systems include a number of terminal units to condition air supplied to spaces associated with the terminal units. At each terminal unit, one or more actuators may be used to control the capacity of the terminal unit. The amount of capacity the terminal unit should be sending at any given time is typically determined by an (automated) controller that sends a corresponding command signal (e.g., a valve opening command, in %) to the terminal unit. Several such command signals may be sent at a given time to control different components of the terminal. The ideal case is that, for instance, a 30% command signal sent to the terminal unit would result in the terminal unit producing 30% of its maximum capacity. This is, however, typically not the case and the terminal unit could be producing far more (e.g. ~90%) or far less (e.g. ~5%) capacity. This prevents such terminal units from being able to properly stabilize their zone at a stable temperature, resulting in inferior comfort for the zone occupiers. The control of the room temperature can be quite off, leading to temperature oscillations that poorly or hardly ever stabilize to the desired temperature (i.e., poor comfort for occupants).

SUMMARY

According to one embodiment, a method for controlling an actuator of a terminal unit in a climate control system includes, in a calibration mode: applying a range of drive signals to the actuator; determining a range of terminal unit capacities over the range of drive signals; and generating a model relating the range of terminal unit capacities to the range of drive signals.

In addition to one or more of the features described above, or as an alternative, further embodiments may include in an operational mode: receiving a command signal; accessing the model to determine a drive signal corresponding to the command signal; and applying the drive signal to the actuator.

In addition to one or more of the features described above, or as an alternative, further embodiments may include wherein generating the model relating the range of terminal unit capacities to the range of drive signals comprises performing a linear regression to derive the model having a statistical fit to the range of terminal unit capacities over the range of drive signals.

In addition to one or more of the features described above, or as an alternative, further embodiments may include wherein generating the model relating the range of terminal unit capacities to the range of drive signals comprises performing a piece-wise linear interpolation of the range of terminal unit capacities over the range of drive signals.

In addition to one or more of the features described above, or as an alternative, further embodiments may include wherein generating the model relating the range of terminal unit capacities to the range of drive signals comprises performing a function identification of the range of terminal unit capacities over the range of drive signals In addition to one or more of the features described above, or as an alternative, further embodiments may include wherein the calibration mode comprises applying drive signals to a plurality of actuators in the terminal unit; and the model relates the range of terminal unit capacities to the range of drive signals for the plurality of actuators.

In addition to one or more of the features described above, or as an alternative, further embodiments may include in an operational mode: receiving a command signal; accessing the model to determine drive signals corresponding to the command signal; and applying the drive signals to the plurality of actuators.

In addition to one or more of the features described above, or as an alternative, further embodiments may include wherein the actuator comprises at least one of a valve, a fan motor and a damper actuator.

In addition to one or more of the features described above, or as an alternative, further embodiments may include wherein in an verification mode: generating a range of command signals; accessing the model to determine drive signals corresponding to the command signals; applying the drive signals to the actuator; and verifying that the terminal unit capacities are within specification According to another embodiment, a climate control system includes a controller; and a terminal unit having an actuator; the controller configured to control the actuator, the controller configured to perform operations comprising: in a calibration mode: applying a range of drive signals to the actuator; determining a range of terminal unit capacities over the range of drive signals; and generating a model relating the range of terminal unit capacities to the range of drive signals.

In addition to one or more of the features described above, or as an alternative, further embodiments may include wherein in an operational mode the controller is configured to perform: receiving a command signal; accessing the model to determine a drive signal corresponding to the command signal; and applying the drive signal to the actuator.

In addition to one or more of the features described above, or as an alternative, further embodiments may include wherein generating the model relating the range of terminal unit capacities to the range of drive signals comprises performing a linear regression to derive the model having a statistical fit to the range of terminal unit capacities over the range of drive signals.

In addition to one or more of the features described above, or as an alternative, further embodiments may include wherein generating the model relating the range of terminal unit capacities to the range of drive signals comprises performing a piece-wise linear interpolation of the range of terminal unit capacities over the range of drive signals.

In addition to one or more of the features described above, or as an alternative, further embodiments may include wherein generating the model relating the range of terminal unit capacities to the range of drive signals comprises performing a function identification of the range of terminal unit capacities over the range of drive signals In addition to one or more of the features described above, or as an alternative, further embodiments may include wherein the calibration mode comprises applying drive signals to a plurality of actuators in the terminal unit; and the model relates the range of terminal unit capacities to the range of drive signals for the plurality of actuators.

In addition to one or more of the features described above, or as an alternative, further embodiments may include in an operational mode: receiving a command signal; accessing the model to determine a drive signals corresponding to the command signal; and applying the drive signals to the plurality of actuators.

In addition to one or more of the features described above, or as an alternative, further embodiments may include wherein the actuator comprises at least one of a valve, a fan motor and a damper actuator.

In addition to one or more of the features described above, or as an alternative, further embodiments may include wherein the controller comprises at least one of a supervisory controller and a terminal unit controller.

In addition to one or more of the features described above, or as an alternative, further embodiments may include wherein in a verification mode the controller is configured to perform generating a range of command signals; accessing the model to determine drive signals corresponding to the command signals; applying the drive signals to the actuator; and verifying that the terminal unit capacities are within specification.

Technical effects of embodiments of the disclosure include the ability to calibrate one or more actuators of a terminal unit to provide a capacity matching a commanded capacity.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments, together with advantages and features, by way of example with reference to the drawings.

DETAILED DESCRIPTION

Figure 1:
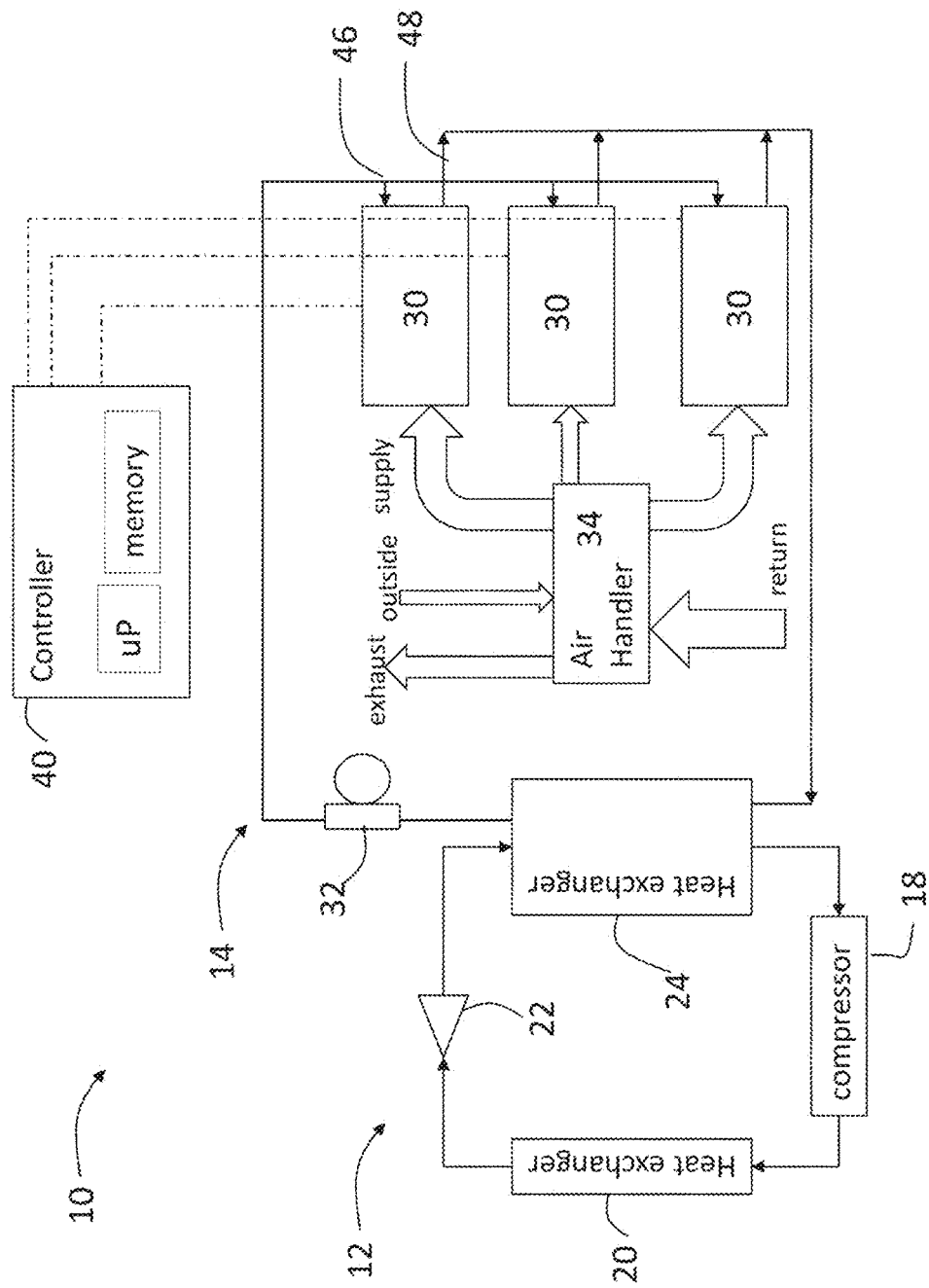
FIG. 1 depicts a climate control system in an exemplary embodiment.

FIG. 1 depicts a climate control system 10 in an exemplary embodiment. The climate control system 10 includes a conditioning system 12 and a terminal unit system 14. The conditioning system 12 includes a compressor 18, first heat exchanger 20 (e.g., condenser/gas cooler), an expansion valve 22 and a second heat exchanger 24 (e.g., an evaporator). In operation in a cooling mode, gaseous refrigerant is induced into compressor 18 and compressed. After the refrigerant is compressed, the high temperature, high pressure refrigerant gas is supplied to condenser 20. In condenser 20, the gaseous refrigerant condenses into liquid as it gives up heat to another fluid (e.g., air). The liquid refrigerant passes through expansion valve 22 to reduce pressure and then flows to evaporator 24. In the evaporator 24, the refrigerant changes state to a gas and absorbs heat from a fluid (e.g., water) passing through evaporator 24. The fluid is circulated in the terminal unit system 14 as described in further detail herein. The low pressure vapor is then drawn into the inlet of compressor 18 and the cycle is continually repeated.

Although the conditioning system 12 is shown as cooling fluid circulated in the terminal unit system 14, the conditioning system 12 may also heat fluid circulated in the terminal unit system 14. A reversing valve may be used to reverse the flow of refrigerant in the conditioning system such that heat exchanger 24 heats fluid circulated in the terminal unit system 14. The conditioning system 12 is not limited to using refrigerant compression systems, but may utilize other techniques (e.g., free cooling, thermoelectric, gas boiler, etc.) to condition fluid circulated in the terminal unit system 14.

The terminal unit system 14 includes a plurality of terminal units 30, each of which supplies conditioned air to a space, such as a building floor, room, etc. Each terminal unit 30 may serve a separate space, or multiple terminal units 30 may supply a single space. Fluid is circulated to and from the terminal units 30 by one or more pumps 32. An air handler 34 provides supply air to each terminal unit 30. As known in the art, the air handler 34 receives return air (a portion or all of which may be expelled as exhaust air) and outside air to form the supply air stream. Each terminal unit 30 includes a coil that receives fluid from pump(s) 32 at a coil inlet 46 and expels fluid at a coil outlet 48. Fluid from the coil outlets 48 is returned to the heat exchanger 24 for conditioning. Supply air flows over the coils to provide a conditioned supply air to each space.

A supervisory controller 40 may communicate with each terminal unit 30 and send command signals to each terminal unit 30. The command signals may command operation of one or more actuators at each terminal unit 30 to achieve a desired capacity (e.g., heating or cooling) at each terminal unit 30. The command signal may refer to a desired output capacity for the terminal unit 30 (e.g., 30% of maximum capacity). The supervisory controller 40 may include a processor and an associated memory. The processor may be but is not limited to a single-processor or multi-processor system of any of a wide array of possible architectures, including field programmable gate array (FPGA), central processing unit (CPU), application specific integrated circuits (ASIC) or digital signal processor (DSP) hardware arranged homogenously or heterogeneously. The memory may be, but is not limited to, a random access memory (RAM), read only memory (ROM), or other electronic, optical, magnetic or any other computer readable medium.

In operation, fluid in the terminal unit system 14 is conditioned (e.g., cooled or heated) at the heat exchanger 24. The pump(s) 32 circulate(s) the fluid to the coils 38 at coil inlets 46. Supply air from the air handler 34 passes over the coils to provide conditioned air to the respective spaces. Once the fluid passes through a coil, it emerges at the coil outlet 48 and is returned to the heat exchanger 24 for further conditioning. Again, FIG. 1 is one example of a climate control system, and a variety of architectures may be used in embodiments of the disclosure.

Figure 2:
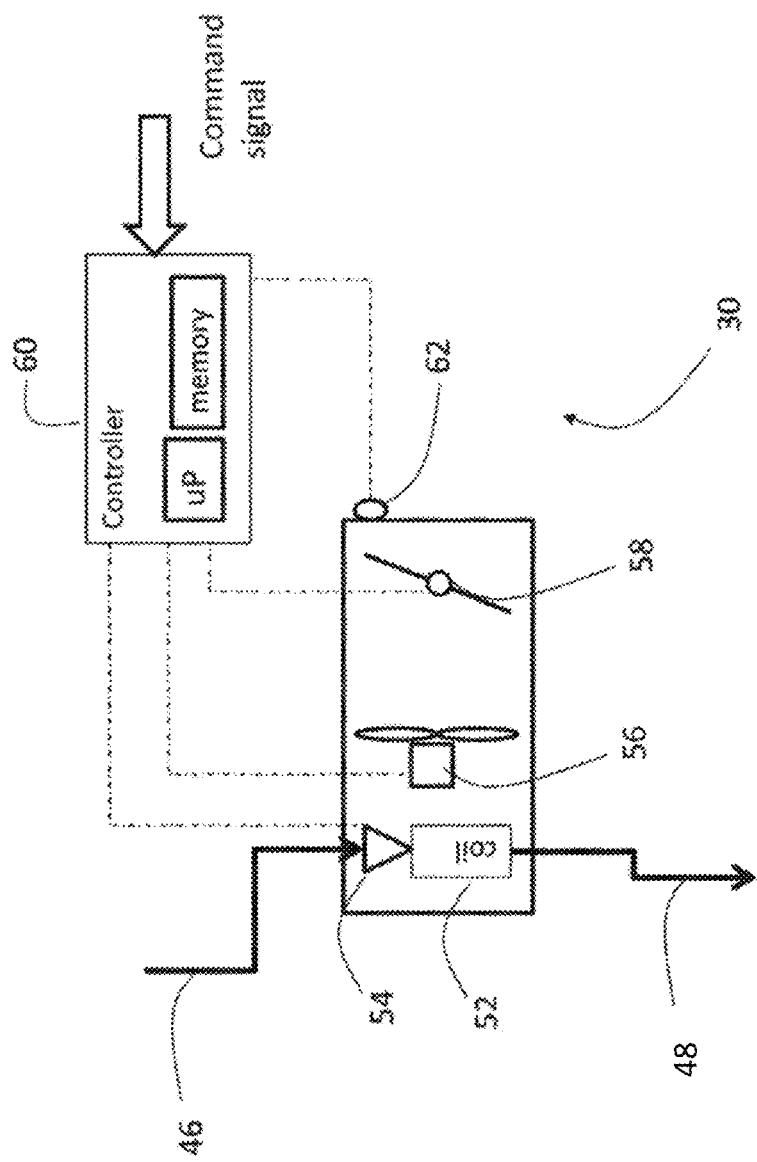
FIG. 2 depicts a terminal unit in an exemplary embodiment.

FIG. 2 depicts a terminal unit 30 in an exemplary embodiment. The terminal unit 30 includes a coil 52. As noted above, supply air passes over coil 52 to provide conditioned air to the space. Flow of conditioned fluid through coil 52 is controlled by a first actuator 54, which may be an electronically controlled valve. Airflow through the terminal unit 30 may be controlled by one or more additional actuators. A second actuator 56 may be a fan motor, and can be controlled to increase or decrease air flow through terminal unit 30. A third actuator 58 may be a damper actuator, and can be controlled to move a damper to increase or decrease air flow through terminal unit 30. Actuators 54, 56 and 58 are exemplary only, and embodiments may use one or more different actuators, alone or in combination, to control capacity of the terminal unit 30.

A terminal unit controller 60 is coupled to the first actuator 54, second actuator 56 and third actuator 58. The terminal unit controller 60 is also coupled to one or more sensors 62 that provide an indication of capacity of the terminal unit 30. The terminal unit controller 60 may include a processor and an associated memory. The processor may be but is not limited to a single-processor or multi-processor system of any of a wide array of possible architectures, including field programmable gate array (FPGA), central processing unit (CPU), application specific integrated circuits (ASIC) or digital signal processor (DSP) hardware arranged homogenously or heterogeneously. The memory may be, but is not limited to, a random access memory (RAM), read only memory (ROM), or other electronic, optical, magnetic or any other computer readable medium.

In operation, the terminal unit controller 60 receives command signals from the supervisory controller 40 and generates one or more drive signals that are applied to each actuator. A command signal may, for example, be a digital signal that specifies a capacity (e.g., a percentage of maximum capacity). A drive signal may, for example, be an analog voltage applied to each respective actuator. As noted above, for an uncalibrated terminal unit 30, the drive signals may result in the terminal unit 30 providing more capacity or less capacity than identified in the command signal.

Figure 3:
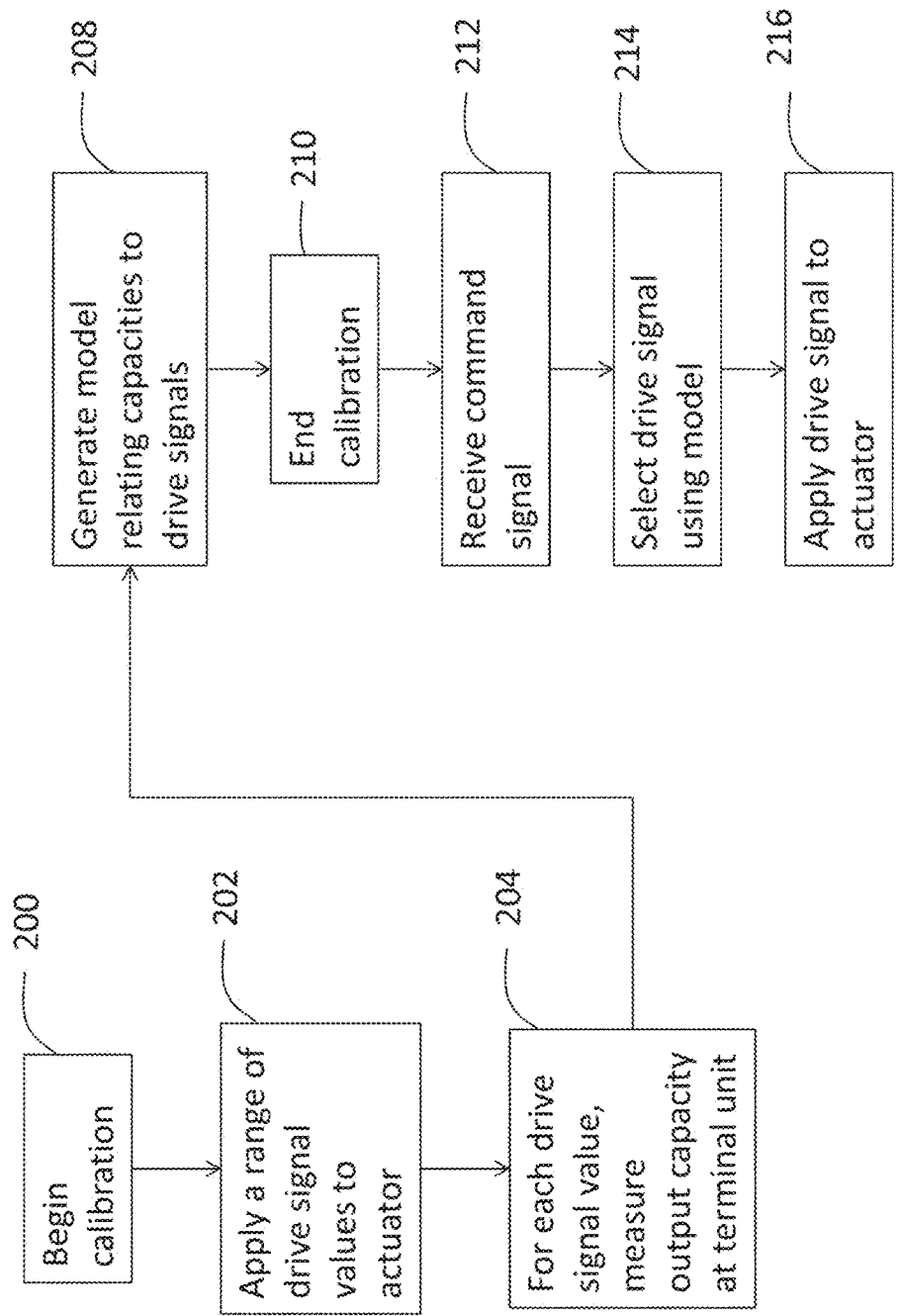
FIG. 3 depicts a flowchart of a process for controlling a terminal unit in an exemplary embodiment.

FIG. 3 depicts a flowchart of a process automatically calibrating a terminal unit 30 so that the produced capacity more closely matches the capacity dictated by the command signals. The process begins at 200 where the terminal unit controller 60 initiates a calibration mode. The calibration mode may be initiated upon commissioning the climate control system 10, and/or periodically (e.g., every 6 months). At 202, the terminal unit controller 60 applies a range of drive signal values to one or more actuators. For example, in calibrating valve 54, the terminal unit controller 60 may apply a range of drive signals from fully closed (e.g., zero volts) to fully open (e.g., 24 volts). It is understood that the process of FIG. 3 may be applied to other actuators, or multiple actuators at once. The calibration of valve 54 is just one example.

At 204, the terminal unit controller 60 measures capacity produced by the terminal unit at each drive signal value to produce a range of capacities over the range of drive signals. Capacity may be measured using one or more sensors 62 associated with the terminal unit 30 or associated with the space conditioned by the terminal unit 30. For example, the terminal unit controller 60 may use the discharge air temperature, the discharge air flow, the coil inlet & outlet water temperature and flow, the room air temperature measures at the terminal unit 30 to determine the capacity being generated. The capacity computation using such signals may be executed at the terminal unit controller 60 or at a higher-level supervisory controller 40.

Figure 4:
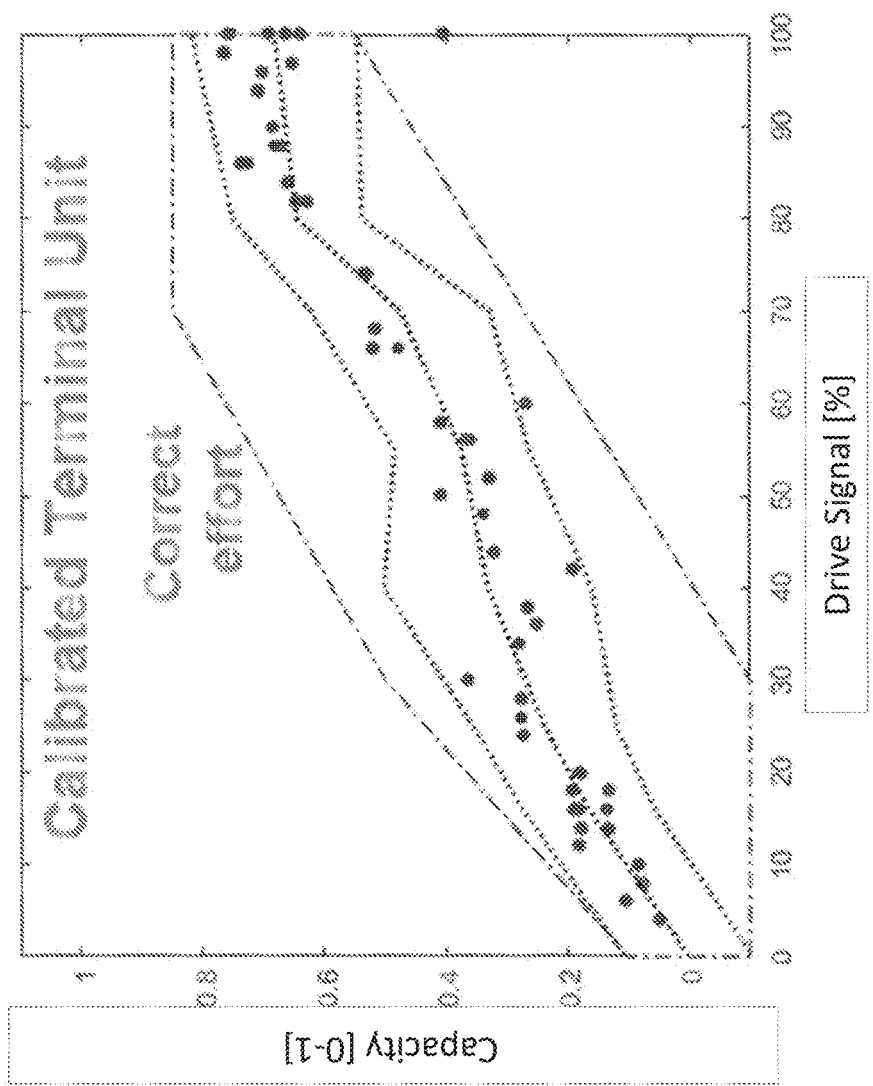
FIG. 4 depicts a model relating terminal unit capacity to drive signal value in an exemplary embodiment.

At 208, the terminal unit controller 60 or the supervisory controller 40 generates a model relating terminal unit capacity to drive signal value. The model may be formed by performing a linear regression or piece-wise linear interpolation through a plot of drive signals versus capacities obtained at 204. The linear regression derives a model having the best statistical fit to the range of terminal unit capacities to the range of drive signals. In another embodiment, the model may be formed by relating the range of terminal unit capacities to the range of drive signals by performing a function identification, such as a polynomial fitting, of the range of terminal unit capacities over the range of drive signals. FIG. 4 illustrates an exemplary model relating terminal unit capacities to drive signals for a single actuator (e.g., valve 54).

Once the model is created at 208, the calibration phase ends at 210 and the system enters an operational mode. At 212, a command signal from the supervisory controller 40 is received at the terminal unit controller 60. The command signal may be represented as a percent of capacity needed. At 214, the terminal unit controller 60 then uses the model to retrieve the correct drive signal to apply to the actuator to achieve the commanded capacity. Alternatively, if the model is available at the supervisory controller 40 level, the supervisory controller 40 sends a control signal to the terminal unit controller 60 which will result in the terminal unit sending the correct drive signal to the actuator (i.e. so that the terminal unit produces the intended capacity). The supervisory controller 40 or the terminal unit controller 60 may store the model in a look up table, where a drive signal value is indexed by a capacity. At 216, the terminal unit controller 60 applies the drive signal to the actuator. Alternatively the supervisory controller 40 may also directly command the drive signal command of the terminal unit (via sending a higher priority order to the terminal controller 60).

The system may also execute a verification mode (e.g., periodically), initiated by the supervisory controller 40. The verification mode is used to confirm that the model generated at 208 is accurately converting command signals to drive signals to obtain the desired terminal unit capacity. In verification mode, the supervisory controller 40 generates a range of command signals. For each command signal, the supervisory controller 40 accesses the model to determine a drive signal corresponding to the command signal and applies the drive signal to the actuator. The supervisory controller 40 then monitors the output capacity of the terminal unit to ensure that the terminal unit output capacities are within specifications. The terminal unit controller 60 may also execute the verification mode.

In the example above, FIG. 3 is described with reference to a first actuator in the form of valve 54. It is understood that the same calibration may be performed for the second actuator 56 and third actuator 58. In addition, although the calibration is described with reference to calibrating a single actuator at a time, the calibration may be performed for multiple actuators simultaneously so that the resultant model relates terminal unit capacity to multiple actuator drive signals.

Embodiments improve accuracy of the level of effort (i.e., thermal capacity output) produced by terminal units, resulting in improved behavior of the room air temperature control (stabilizing faster and with reduced or no oscillation around the room temperature set-point). Moreover and more specifically, calibrated terminal units remove the need for so-called 'dead-bands' (typically plus and minus 1° C. around the room temperature set-point), inside of which the terminal unit is off and outside of which the terminal unit very often either reacts too slowly or too fast. Removing the dead-band allows the terminal unit to stabilize its effort at just the right amount, which results in a well-maintained constant room temperature. Additional benefits include reduce commissioning effort, as well as counter-balancing or reducing the impact of terminal unit faults (resulting in more robust units providing better comfort and requiring less maintenance).

While the disclosure has been described in detail in connection with only a limited number of embodiments, it should be readily understood that the invention is not limited to such disclosed embodiments. Rather, the disclosure can be modified to incorporate any number of variations, alterations, substitutions or equivalent arrangements not heretofore described, but which are commensurate with the scope of the invention. Additionally, while various embodiments have been described, it is to be understood that aspects of the invention may include only some of the described embodiments. Accordingly, the disclosure is not to be seen as limited by the foregoing description, but is only limited by the scope of the appended claims.

What is claimed is:

1. A method for controlling an actuator of a terminal unit in a climate control system, the method comprising:
    in a calibration mode:
        applying a range of drive signals to the actuator;
        determining a range of terminal unit capacities over the range of drive signals,
            wherein the range of terminal unit capacities indicates a degree of heating or cooling including at least one of a measured temperature and measured airflow; and
        generating a model relating the range of terminal unit capacities to the range of drive signals;
    in an operational mode:
        receiving a command signal;
        accessing the model to determine a drive signal corresponding to the command signal; and
        applying the drive signal to the actuator;
    in a verification mode:
        generating a range of command signals;
        accessing the model to determine drive signals corresponding to the command signals;
        applying the drive signals to the actuator; and
        verifying that the terminal unit capacities are within specification.

2. The method of claim 1 wherein: generating the model relating the range of terminal unit capacities to the range of drive signals comprises performing a linear regression to derive the model having a statistical fit to the range of terminal unit capacities over the range of drive signals.

3. The method of claim 1 wherein: generating the model relating the range of terminal unit capacities to the range of drive signals comprises performing a piece-wise linear interpolation of the range of terminal unit capacities over the range of drive signals.

4. The method of claim 1 wherein: generating the model relating the range of terminal unit capacities to the range of drive signals comprises performing a function identification of the range of terminal unit capacities over the range of drive signals.

5. The method of claim 1 wherein: the actuator comprises at least one of a valve, a fan motor and a damper actuator.

6. A climate control system comprising:
    a controller; and
    a terminal unit having an actuator;
    the controller configured to control the actuator, the controller configured to perform operations comprising:
    in a calibration mode the controller is configured to perform:
        applying a range of drive signals to the actuator;
        determining a range of terminal unit capacities over the range of drive signals,
            wherein the range of terminal unit capacities indicates a degree of heating or cooling including at least one of a measured temperature and measured airflow; and
        generating a model relating the range of terminal unit capacities to the range of drive signals;
    in an operational mode the controller is configured to perform:
        receiving a command signal;
        accessing the model to determine a drive signal corresponding to the command signal; and
        applying the drive signal to the actuator;
    in a verification mode the controller is configured to perform:
        generating a range of command signals;
        accessing the model to determine drive signals corresponding to the command signals;
        applying the drive signals to the actuator; and
        verifying that the terminal unit capacities are within specification.

7. The climate control system of claim 6 wherein: generating the model relating the range of terminal unit capacities to the range of drive signals comprises performing a linear regression to derive the model having a statistical fit to the range of terminal unit capacities over the range of drive signals.

8. The climate control system of claim 6 wherein: generating the model relating the range of terminal unit capacities to the range of drive signals comprises performing a piece-wise linear interpolation of the range of terminal unit capacities over the range of drive signals.

9. The climate control system of claim 6 wherein: generating the model relating the range of terminal unit capacities to the range of drive signals comprises performing a function identification of the range of terminal unit capacities over the range of drive signals.

10. The climate control system of claim 6 wherein: the actuator comprises at least one of a valve, a fan motor and a damper actuator.

11. The climate control system of claim 6 wherein: the controller comprises at least one of a supervisory controller and a terminal unit controller.

* * * * *